July 29, 1941.  J. H. WILLIAMS  2,250,515
GLASS GATHERING AND MOLDING APPARATUS
Filed Oct. 2, 1937  3 Sheets-Sheet 1
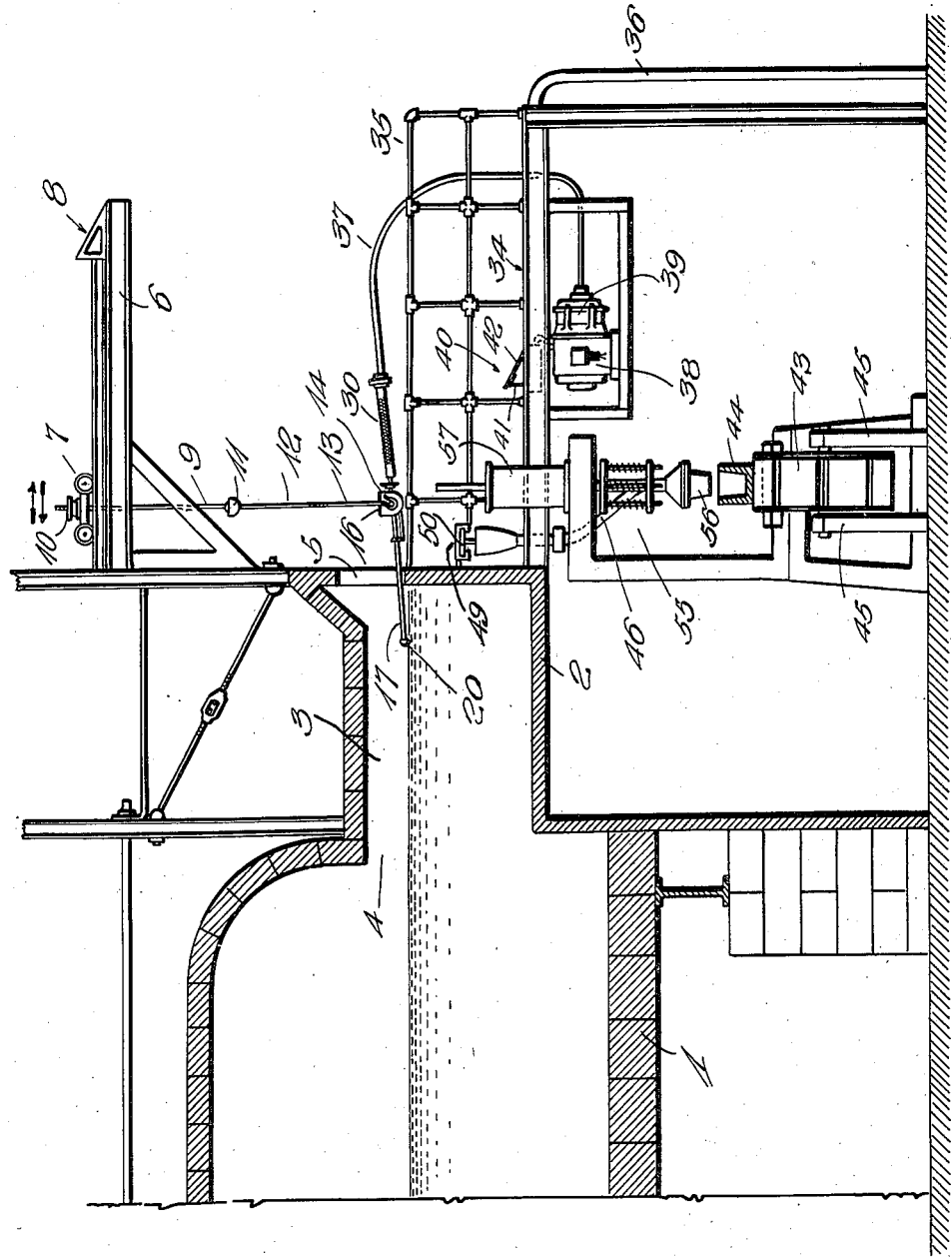
INVENTOR.
Josiah H. Williams
BY
C. C. Hines,
ATTORNEY.

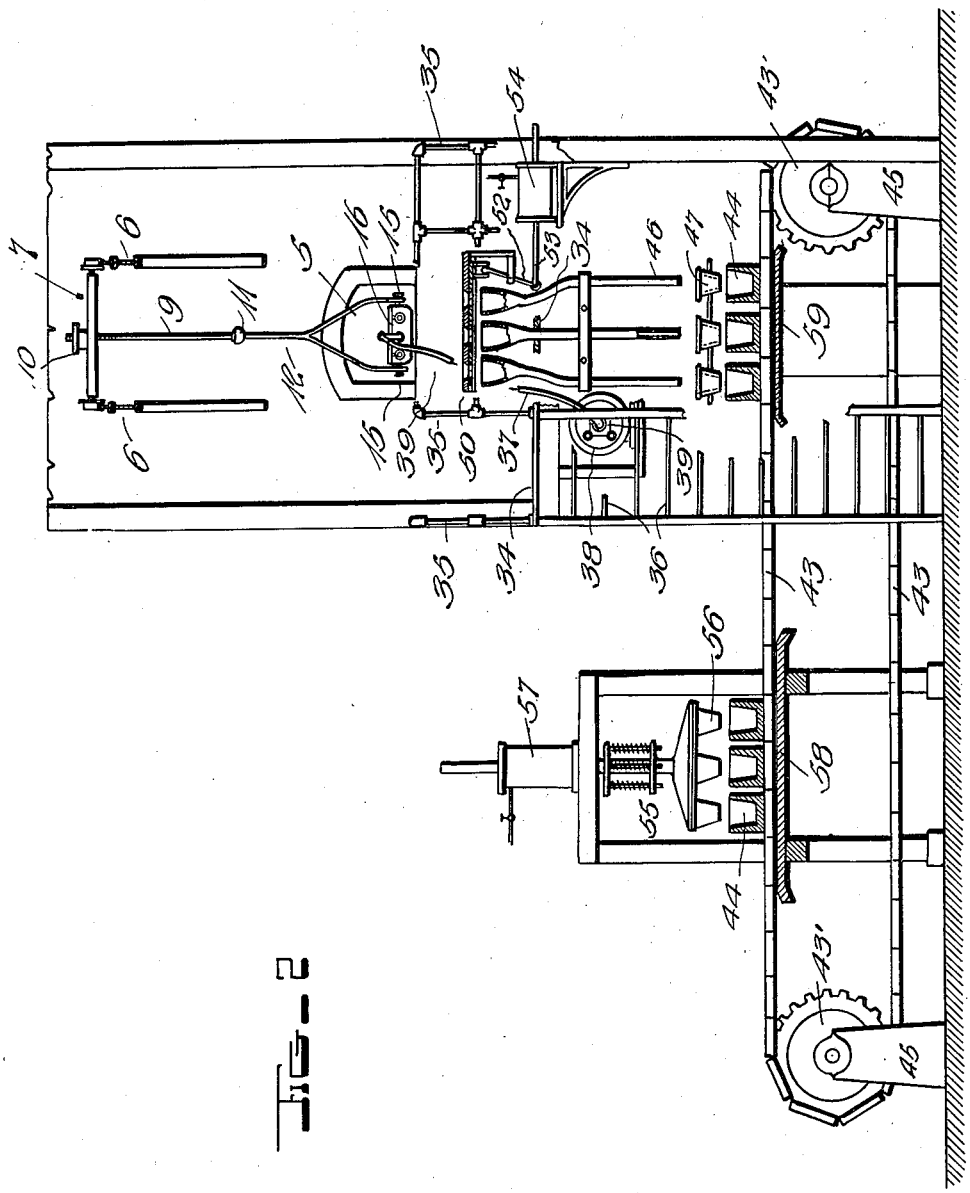

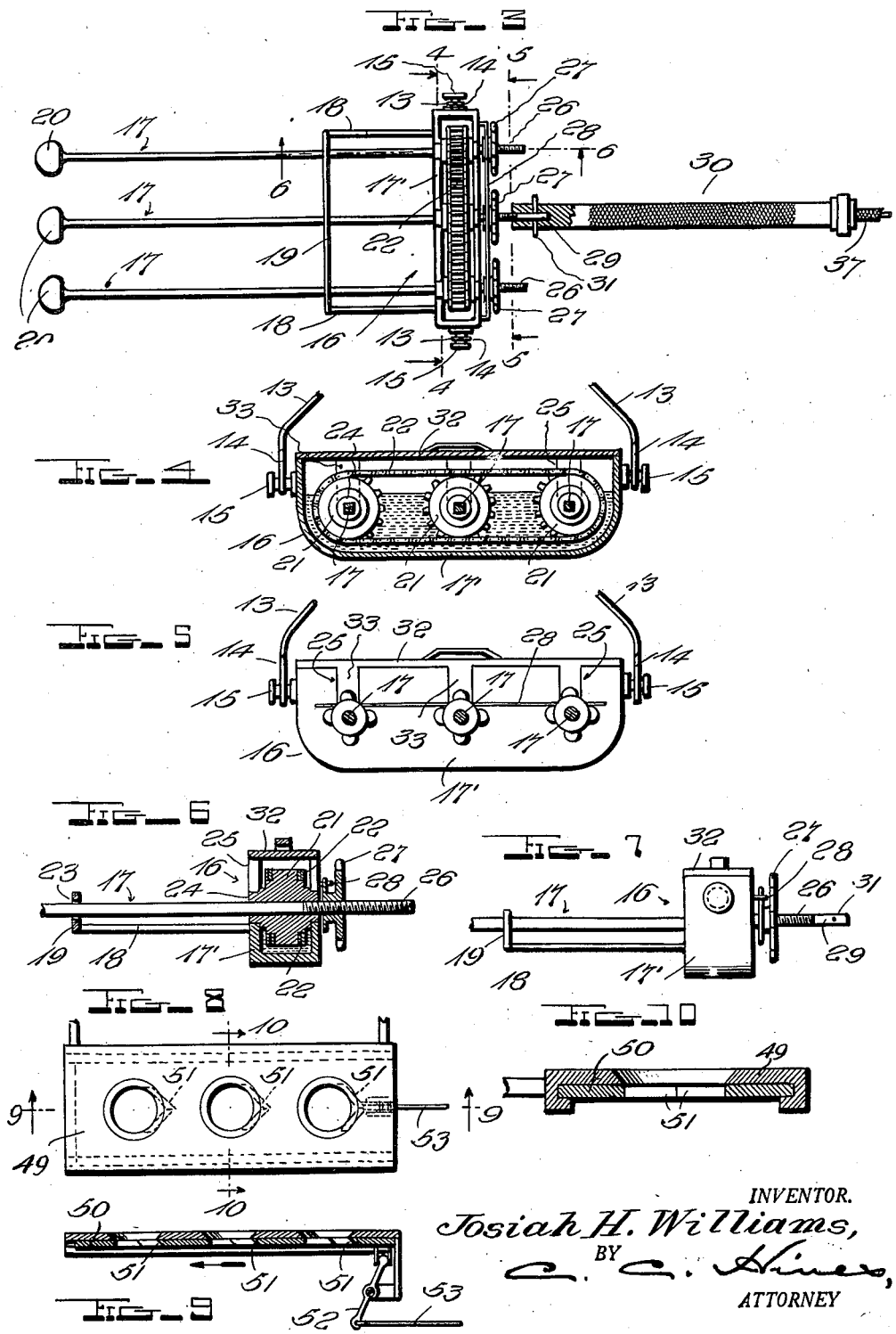

Patented July 29, 1941

2,250,515

UNITED STATES PATENT OFFICE 2,250,515

GLASS GATHERING AND MOLDING APPARATUS

Josiah H. Williams, Baltimore, Md.

Application October 2, 1937, Serial No. 167,047

24 Claims. (Cl. 49—5)

This application is a continuation-in-part of my application No. 154,662, filed July 20, 1937.

This invention relates to a glass gathering and molding or pressing apparatus for gathering charges of glass and molding or pressing desired articles of glassware therefrom.

One object of the invention is to provide an apparatus whereby a plurality of gobs or charges of glass may be simultaneously gathered and simultaneously deposited in a convenient and time saving manner in a corresponding number of molds, and whereby the charges so deposited may be simultaneously formed into articles of the desired kind.

A further object of the invention is to provide a novel construction and arrangement of hand gathering means and molding or pressing means whereby the work of bringing the charges into charging position and charging the molds therewith is facilitated and the amount and number of working movements required for these operations reduced with a material saving in time and labor over customary operations and with less fatigue to the operator.

A still further object of the invention is to provide means whereby a plurality of charges may be gathered by the gatherer and such charges simultaneously severed from the gatherer for deposit into the molds, and whereby groups of mold chambers, each of a number to receive the charges from the gatherer, may be disposed, or successively brought, into position for the gathering and molding operations.

A still further object of the invention is to provide a gatherer of multiple punty type the punties of which may be simultaneously rotated for the gathering operations by hand or power or by combined hand and power actions.

A still further object of the invention is to provide a novel construction and arrangement of means for positioning the punties for accurate feed of the charges into the molds, for severing the charges from the punties, and for guiding the severed charges into the molds.

With these and other objects in view, the invention consists of the novel features of construction, combination and arrangement of parts, hereinafter more fully described and set forth in the appended claims, and as shown in the accompanying drawings, in which:

Fig. 1 is a vertical section through a glass furnace showing in end elevation my novel and improved glass gathering and molding or pressing apparatus.

Fig. 2 is a rear view of the apparatus, with parts broken away and in section, and looking toward the ring hole of the furnace.

Fig. 3 is a top plan view, with parts in section, of the gathering device.

Fig. 4 is a section on line 4—4 of Fig. 3.

Fig. 5 is a section on line 5—5 of Fig. 3.

Fig. 6 is a detail section on line 6—6 of Fig. 3.

Fig. 7 is a view in end elevation of the gatherer frame and parts carried thereby.

Fig. 8 is a plan view of the cutter.

Figs. 9 and 10 are respectively a longitudinal section and a transverse section thereof, taken on lines 9—9 and 10—10 of Fig. 8.

Referring now more particularly to the drawings, 1 designates a glass melting tank or furnace having an extension 2 forming a gathering chamber 3 into which the molten glass flows through the furnace outlet 4, said chamber being provided at its outer side with a ring hole or gathering opening 5 at a suitable high level above the floor of the room in which the tank or furnace is disposed.

As a part of the glass gathering and molding or pressing apparatus herein disclosed I preferably employ a multiple glass gatherer of the character shown in my prior application Serial No. 154,662, filed July 20, 1937. This gatherer is of multiple punty type and comprises a trackway 6, arranged at a suitable level above that of the opening 5, and which supports a wheeled carriage 7 movable on the trackway toward and from the furnace and which is limited in its outward movement by a stop 8.

The carriage is apertured to slidably receive the upper threaded end of a hanger bar or rod 9 which depends therefrom. The said threaded upper end of this bar or rod is engaged by a nut 10 which rests on the carriage and by means of which the bar or rod may be vertically adjusted. The lower end of the bar or rod 9 has a ball and socket or universal joint connection, as at 11, with the upper end or vertex of an inverted V-shaped or bail-shaped suspending member or bracket 12, one element of the ball and socket connection being formed on the lower end of the rod 9 and the other at the vertex of the bracket 12. The joint element of the bracket 12 is preferably formed rigidly with the bail arms 13 of the bracket which terminate at their lower ends in bearing members 14, which are preferably in the form of hooks. These hooks receive and engage trunnions 15 on a frame 16 which supports the gathering irons or punties 17.

The frame 16 comprises an outer portion or head 17' forming a gear chamber. From this outer portion or head extend frame arms 18 united at their outer ends by a cross piece 19. In this head 17' and cross piece 19 are mounted for axial rotation the punties or gathering irons 17. Three such punties or gathering irons are shown in the present instance, although a greater or lesser number may be used, and each of these punties comprises a rod or bar provided at its forward end with a gathering head 20.

Adjacent their rear ends the punties extend through openings in the outer and inner walls of the frame head 17', and the portions of the punties disposed on the head are of square or other angular form in cross-section and carry gears 21, the gears 21 of the respective punties being connected by a chain 22 whereby all the punties are adapted to be rotated or oscillated in unison in the same direction and at the same speed. Each punty is journaled at a point in advance of the head 17' in a bearing opening 23 in the cross piece 19 by means of which the punties are properly alined and caused to rotate accurately in fixed planes. The gears 21 are suitably constructed so as to allow removal of the punties, or of the gears, for repairs or replacements in a ready and convenient manner, while ensuring proper maintenance of the gears in position to receive the punties. To this end each gear is preferably provided with journals 24 which rotate in the openings in the walls of the head 17' through which the punty rods extend. Each gear and its journals are provided with a bore of rectangular or other angular form corresponding to that portion of the punty rod which fits therein, whereby the rod may be engaged with or disengaged from its gear by an endwise sliding movement in one direction or the other through the gear and bearing openings 23 in the cross piece 19. This allows ready and convenient assemblage or disassemblage of the gatherer parts and the removal of punties or gears whenever repairs or replacements become necessary. In practice, the punty heads 20 may be of such type as to permit a new head to be applied in place of a worn out or damaged one without the necessity of the removal of the punty from the frame.

The frame head 17', in addition to serving as a gear chamber, also serves as a receptacle for oil or other lubricating and cooling liquid, whereby the gear parts may be properly lubricated for easy action and the gearing and frame head kept comparatively cool. To further ensure easy operation of the gearing, roller, ball or other suitable anti-friction bearings for the gears may be used, to make the operation of rotating or oscillating the punties sufficiently easy for the workman.

The bearing openings for the journals 24 are preferably of open type, that is, in the form of slots 25 which open at their upper ends through the upper edges of the walls of the heads 17'. This allows the gears to be initially slid into position from above and readily removed, after withdrawal of the punty rods, to enable cleaning, repairs or renewal of gears to be easily and conveniently carried out. Such construction also ensures the disposition of the gears so that they will be properly arranged with their bores in exact alinement with the bearing openings 23, so as to allow and facilitate application and removal of the punty rods by simple sliding movements thereof. The rear ends of the punty rods extend a suitable distance beyond the outer or rear wall of the frame head 17' and are threaded, as at 26, to receive adjusting nuts 27 of hand wheel or milled head type, by means of which the rods may be adjusted longitudinally, forwardly or backwardly, to properly center the punty heads 20 with relation to each other, or to maintain them in exact alinement for their gathering operations. These nuts have annularly grooved hubs for engagement with a fixed bar or other retaining means 28 on the frame head 17' whereby the nuts are held from other than rotary movements in fixed paths.

The outer or rear end of one of the punty rods of the series, the central one as shown in the present instance, is also provided with an angular portion 29 extended beyond its threaded portion 26 whereby it may be connected with an operating handle or pilot 30. This handle or pilot may be of any suitable form and type to adapt it to be gripped by both hands of the workman to allow the workman to manually manipulate the punties and to simultaneously rotate or oscillate the same. It is preferably provided with a milled or other form of gripping surface which will allow the workman to secure a firm grip, and it is shown in the present instance as provided at its forward end with a socket to receive the angular end 29 of the center punty rod, to which it may be fastened by a pin or other suitable fastening device 31.

The top of the chamber in the head 17' may be closed by a suitable detachable cover 32 to protect the enclosed parts from access of dust and dirt. This cover may be detachably secured in position by any suitable type of fastening means, and it may be provided with projections 33 to extend into the bearing slots or openings 25 in the frame head 17' to keep such portions of the slots closed and to obviate any liability of upward movement of the gears in their bearing slots.

Arranged at a convenient level between the floor of the room in which the furnace is arranged and the gathering opening 5 is a platform 34 on which the operator stands in manipulating the gathering tool, and which is so positioned as to allow him to have clear vision through the opening 5 in order that he may observe the condition of the glass and that of the gathers in the gathering operation. The arrangement of this platform also provides a convenient storage place below for the placing of certain parts of the apparatus if desired, as well as to provide for the arrangement of molds hereinafter described for the gravity feed of the gathered gobs thereto and to reduce the amount or number of working movements of the workman and time consumed in performing such movements. This platform 34 is preferably provided at each side with a guard rail 35 and a ladder 36 is placed so as to allow the workman to ascend and descend from the platform. From his position on the platform the workman may by gripping the pilot or handle 30 of the gathering tool in his hands shift the tool forwardly and backwardly through the gathering opening 5 and tilt the tool vertically on the joint 11 and trunnions 15 to dip the headed ends of the introduced punties into and out of the glass of the chamber 3 or swing such ends of the punties downwardly to properly position them for the severance of the gathers and deposit in guides for travel to the molds. In moving the gathering device backwardly and forwardly the gathering device is bodily supported by the carriage 7 which travels on the rail 6, thus relieving the operator entirely from the burden and exertion of physically supporting and manipulating the tool, so that he may employ both hands to rotate or oscillate the handle or pilot 30 in the gathering operations and to shift the tool backwardly and forwardly and tilt it upwardly and downwardly with a minimum amount of effort on his part. It may be found desirable at times to employ power means for rotating the punties during the gathering operation, particularly in the use of a large gathering tool and in forming large and weighty gathers, or to assist the operator in turning the punties while they are being rotated in the body of glass. To this end, I provide power means for driving the punties through their rotating gearing, such means, as shown in the present instance, comprising a flexible shaft 37 driven from an electric motor 38 and connected to the handle or pilot 30. The flexibility of this drive shaft allows the punties to be motor driven and the tool manipulated by the workman without interference from the driving mechanism. The motor may be conveniently supported from the underside of the platform 34, as shown. The motor employed is preferably a torque motor, namely, a slow speed motor with a gear reduction unit generally indicated at 39, built into its driving end, for transmitting motion to the flexible shaft 37 at a reduced speed with respect to the speed of the motor shaft, so that a turning motion at a proper low speed may be applied to the pilot or handle 30. Such a motor is designed so that it will exercise a predetermined pull and does not create its power with revolutions as do ordinary induction motors, so that by the use of such type of motor and a proper reduction gear the punties may be driven at a required slow speed to prevent spattering or spreading and intermingling of the glass on the punties due to excessive speed. A rheostat or switch device 40 of suitable type for cutting in and out resistance governing the supply of current to the motor and the amount of pull developed is provided. This, as shown in the present instance, includes a movable switch member or operating element 41 controlled in action by a pivoted foot pedal 42 on the platform, whereby the working operation of the motor may be controlled by foot pressure, leaving both hands of the operator free to manipulate the gathering device. Any suitable character of feed connections may be provided for the supply of current through the switch or rheostat to the motor from a supply line. The operator may thus, according to conditions, either manually rotate the punties, or power rotate them, or use power in addition to hand operation for rotating the punties, making the operation easy in working the punties in the glass and particularly in rotating large punties or forming large gathers. I do not, however, limit myself to the use of this particular type of motor, as any other suitable type of motor and driving means giving the desired result may be employed.

Arranged preferably beneath the platform 34 and in parallel relation to the front of the furnace is an endless conveyor 43 for supporting the molds 44 in which the gobs or gathers are deposited for the formation of glassware. This endless conveyor is preferably of link chain type mounted to travel upon sprocket wheels 43' journaled in suitable supporting pedestals or bearings 45 and which in practice may be intermittently driven by any suitable type of power applying mechanism, not shown. The molds are mounted in working groups on a conveyor, the number of molds in each group corresponding to the number of punties mounted on the gatherer. The groups of molds are also so disposed on the conveyor that when one group is in gather receiving position another group may be in position for the molding or pressing action. Two groups of molds so relatively arranged are shown in Fig. 2, but it is to be understood that any number of working groups so relatively arranged may be provided on the conveyor. The molds 44 which are disposed in receiving position are fed with the gobs or gathers from the punties by guide tubes 46 having enlarged or funnel-shaped upper ends to receive the gathers from the punties and arranged to guide the gathers to delivery funnels 47 disposed above the molds. These funnels may be mounted so as to be moved into and out of operative position. A multiple cutter or severing device 48 is arranged above the inlet ends of the guides and comprises a guide frame member 49 and a multiple cutter 50. The guide frame and cutter have openings for the passage of the gobs of glass depending from the punties, certain walls of the openings in the cutter blade being beveled to form cutting surfaces 51. The cutter blade 50 is mounted to reciprocate in the guide frame and with relation to the openings therein so that in its movement in one direction it will sever the gobs from the punties and in its movement in the opposite direction it will return to normal position for the registration of the openings to allow the gobs next gathered to pass downward therethrough. The cutter 50 is adapted to be reciprocated by an actuating element 52 coupled to a rod 53 which in turn is coupled to a working piston in an air cylinder 54, to which air may be supplied in any conventional manner to effect the back and forth movements of the cutter blade.

While the operation of gathering glass for one set of molds arranged in receiving position is being carried out the operation of pressing the glass in another set of molds may be going on, and the conveyor 43 may be intermittently moved at the proper time periods to effect the shifting of the sets of molds thereon into receiving and pressing positions. As shown, a press 55 of any suitable type may be disposed wholly or mainly below the platform 34 at the press position. The press 55 shown is one having plunger or forming members 56 adapted to be moved downwardly into the molds disposed thereneath to properly form the desired articles in such molds, and then to be moved upwardly and withdrawn from the molds to enable the molds to be shifted for discharge of the formed articles therefrom. The forming elements 56 may be operated by pneumatic means of any suitable or conventional type including an actuating cylinder 57 and an actuating piston disposed therein. On the movement of the molds past pressing position and the travel of the upper stretch of the conveyor on which it is mounted downwardly around the guide sprocket 43' at the discharge end of the conveyor the articles formed in the molds may be discharged by gravity or in any other suitable manner on or into a suitable receiver. Suitable supports 58 and 59 are preferably arranged beneath the upper stretch of the conveyor at the glass receiving and pressing points to support the molds while they are being charged and while the charges are being pressed therein. The arrangement of mold groups and pressing apparatus shown is a convenient one, but other suitable arrangements may obviously be employed.

It will be seen from the foregoing that in the operation of the apparatus the operator may gather a plurality of batches or gobs of glass at a time by means of a multiple punty gatherer which may be operated in the conventional way to gather the glass, but which is mounted in such manner that the weight of the gatherer is entirely supported so that the operator is relieved therefrom, and may therefore manipulate, by hand, by power, or by combined hand and power operations a plurality of punties at a time, without great physical effort or exertion on his part. It will also be seen that when the gathering tool is withdrawn from the furnace, with the glass charges taken up on the gatherer heads, the operator may conveniently jiggle or otherwise manipulate the punties to shape the gathers and then, by tilting the gathering tool, bring the headed ends of the punties in line with the openings in the cutter so that the gathers may depend therethrough and be simultaneously severed for delivery to the receiving molds. In practice, the stop 8 at the outer end of the overhead truck is arranged so as to arrest the outward movement of the carriage 7 to stop the outward movement of the gathering tool at the point where the tool is in position for the downward tilting of the punty heads into accurate register with the openings in the cutter. This ensures convenience and accuracy in the glass feeding operation with a limited degree of movement on the part of the operator and the drawing tool, the operator not being compelled to shift the tool around or to walk any distance in order to deposit the glass into the molds, so that time and labor are saved in the feeding operation and the number of feeding actions during a day's work may be increased without undue fatigue on the part of the operator. In addition to the fact that a plurality of charges of glass may be supplied to a plurality of molds on each working operation, the arrangement of the gatherer, molds and press is such that a greater number of multiple gathering and molding operations may be employed within any working period of time than has been possible in performing single gathering and molding operations with arrangements of the kind heretofore in use, enabling a much greater output of articles and the operating costs to be proportionately reduced.

From the foregoing description, taken in connection with the accompanying drawings, the construction and mode of operation of my improved glass gathering and molding or pressing apparatus will be readily understood by those versed in the art without a further and extended description, and it will be seen that the invention provides a means whereby multiple charges may be hand gathered and molded into articles in a rapid manner by the use of mechanism of a very simple character and in such a way as to enable production to be increased and articles to be produced at a lower cost than is possible by the conventional methods now in use. While the construction of the apparatus herein disclosed is preferred, it will, of course, be understood that changes in the form, proportions, construction and arrangement of parts may be made, within the scope of the appended claims, without departing from the spirit or sacrificing any of the advantages of the invention.

What I claim is:

1. In a glass gathering apparatus, a gathering tool comprising a plurality of punties, a frame in which said punties are mounted for axial rotation, gearing for rotating the punties in unison in the same direction, a pilot handle carried by the frame and connected to the gearing whereby the tool may be manipulated and the gearing manually operated for gathering actions, and power means for operating the gearing comprising a torque motor, a reduction gearing driven by the motor, a flexible shaft for transmitting motion from the reduction gearing to the first-named gearing, and means for cutting in and out and regulating the flow of current to the motor.

2. In a glass gathering device, a supporting frame movable toward and from a furnace, a plurality of axially rotatable gathering irons carried by the frame, gearing for either rotating or oscillating the irons in unison in the same direction manually operable means actuable for either rotating or oscillating the irons in unison through the gearing, power driven means for rotating the irons in unison through the gearing, and means for rendering said power means active or inactive, said manually operable and power driven means being connected to the gearing so as to adapt them to be operated to rotate the irons for a gathering action by power from the power means, by manual operation of the manually operable means, or by both, and to adapt the manually operable means to be independently operated to rotate and oscillate the irons when the gathers are made to retain and shape the gathers on the irons.

3. In a glass gathering device, a supporting frame movable toward and from a furnace, a plurality of axially rotatable gathering irons carried by the frame, gearing for rotating or oscillating the irons in unison in the same direction, a manually operable member adapted to be engaged by the hands of the operator and rotated or oscillated thereby for rotating or oscillating the irons in unison through the gearing, power driven means for rotating the irons in unison through the gearing, and means constructed and arranged to adapt the power driven means to be cut into or out of action by the operator while the hands of the operator are engaged with and operating said member.

4. In combination, a furnace for containing molten glass, said furnace having a gathering opening, a glass gathering device comprising a frame movable toward and from a furnace, a plurality of axially rotatable gathering irons mounted in the frame, gearing connecting the irons for rotating them in unison, a manually operable member adapted to be engaged by the hands of the operator and rotated or oscillated thereby for rotating or oscillating the irons in unison through the gearing, power driven means for rotating the irons in unison through the gearing, and a power control device constructed and arranged so as to be operated by a part of the body of the operator other than his hands and while the hands are engaged with said member for letting on or cutting off the supply of power to the power driven means.

5. In a glass gathering device, a supporting frame movable toward and from a furnace, a plurality of axially rotatable gathering irons carried by the frame, gearing for rotating or oscillating the irons in unison in the same direction, a manually operable member adapted to be engaged by the hands of the operator and rotated or oscillated thereby for rotating or oscillating the irons in unison through the gearing, electric motor driven means including a reduction gearing for rotating the irons in unison through the first-named gearing, and a device for controlling the supply of current to the motor constructed and arranged to be operated by the operator while the hands of the operator are engaged with and operating said member.

6. In combination, a furnace for containing molten glass, said furnace having a gathering opening, a glass gathering device comprising a frame, an overhead support, means suspending the frame from said support so that the frame may be moved toward and from said gathering opening, a plurality of axially rotatable gathering irons mounted in the frame, gearing connecting the irons for rotating them in unison, a pilot handle carried by the frame and connected to the gearing and adapted to be engaged by the hands of the operator and rotated or oscillated thereby, an electric motor, a reduction gearing driven by the motor, a flexible shaft driven by said reduction gearing from the motor and connected to the pilot handle, and a foot controlled device for controlling the supply of current to the motor.

7. In a glass gathering device, a supporting frame movable toward and from a furnace having a gathering opening, a plurality of axially rotatable gathering irons carried by the frame and movable thereby into and out of the furnace through the gathering opening, gearing for rotating the irons in unison in the same direction and at the same speed, a member carried by the frame and adapted to be engaged by the hands of the operator and rotated thereby for rotating the irons in unison through the gearing, a platform on which the operator stands, said platform being arranged adjacent to and in a horizontal plane below the horizontal plane of the gathering opening, power driven means supported by the platform and connected to the gearing for rotating the irons in unison through the gearing, and a power control device mounted on the platform in position to be operated by a foot of the operator manipulating the device whereby the power driven means may be cut into or out of action while the hands of the operator are engaged with and operating said member.

8. In a glass gathering apparatus, a glass melting furnace having a gathering opening, and a gathering tool comprising a plurality of punties, a frame in which said punties are mounted for axial rotation, gearing for rotating or oscillating the punties in unison in the same direction, supporting means mounting the tool for up and down tilting movements and for movements toward and from the gathering opening, said supporting means acting to hold the frame from tilting laterally and to thereby maintain the punties in horizontal working alinement, a manually operable member for manipulating the tool in such movements and for rotating or oscillating the punties through said gearing, a motor driven means for imparting driving motion to the punties through said gearing, and means for controlling the action of the motor driven means whereby said member is rendered operable for imparting driving motion to the gearing independently of or conjointly with said motor driven means.

9. In a glass gathering apparatus, a gathering tool comprising a frame, a plurality of axially rotatable and oscillatable punties mounted in the frame, gearing connecting the punties for rotating or oscillating them in unison, a pilot handle carried by the frame and connected to the gearing whereby the tool may be manipulated and whereby the gearing may be manually operated to rotate or oscillate the punties, and a motor driven means adapted to be thrown into action for operating the gearing in conjunction with said pilot handle.

10. In a glass gathering apparatus, a gathering tool comprising a plurality of axially rotatable and oscillatable punties, gearing connecting said punties for axial rotation in the same direction in unison and at the same speed, a support mounting said punties for movement toward and from a furnace, manually operable means for operating said gearing to rotate the punties, and motor driven means separate from and independent of the support for operating said gearing in conjunction with said manually operable operating means.

11. In a glass gathering apparatus, a gathering tool comprising a plurality of axially rotatable and oscillatable punties, gearing connecting all the punties for axial rotation and oscillation in unison in the same direction and at the same speed, a support mounting said punties for movement toward and from a furnace and for tilting movements in a vertical plane, a pilot member carried by the support for moving the support toward and from the furnace and tilting the punties, said member being coupled to the gearing and manually operable to operate the gearing to rotate or oscillate the punties, motor driven means coupled to the gearing so as to normally allow operation of the gearing by the pilot member independently of the motor driven means, and means for rendering the motor driven means effective or ineffective at the will of the operator for operating the gearing, whereby the punties may be rotated or oscillated by manual operation of the pilot member, rotated by action of the motor driven means or conjointly rotated by operation of the pilot member and motor driven means.

12. In a glass gathering apparatus, a gathering tool comprising a plurality of parallel shafts, punties operated by the shafts, a frame in which said shafts are mounted for axial rotation and oscillation, indirect gearing between and connecting the punties for rotation or oscillation in unison in the same direction and at the same speed, a support mounting said frame for movement toward and from a furnace, normally inactive motor driven means for rotating the shafts and punties through said gearing for a glass gathering action, a manually operable device for manipulating the tool and rotating or oscillating the shafts and punties through said gearing, said manually operable device being operable in an inactive state of the motor driven means at the end of a glass gathering action to operate the gearing to rotate and oscillate the punties so as to retain and shape the glass gathers on the punties, and means for rendering the motor driven means active or inactive.

13. In a glass gathering apparatus, a gathering tool comprising a plurality of punties, a frame in which said punties are mounted for axial rotation and oscillation, gearing for rotating or oscillating the punties simultaneously in the same direction and at the same speed, a support mounting said frame for movement toward and from a furnace, means including a pilot handle for manipulating the tool and manually rotating or oscillating the punties, motor driven means coupled to the pilot handle for power rotation of the punties simultaneously through the gearing, and means operable by the operator while his hands are engaged with the pilot handle and manipulating the same for rendering the motor driven means effective or ineffective.

14. In combination, a furnace for containing molten glass, said furnace having a gathering opening, a glass gathering tool comprising a frame a plurality of axially rotatable and oscillatable punties mounted in the frame, gearing between the punties for rotating or oscillating the punties simultaneously in the same direction and at the same speed, supporting means arranged in fixed relation to the furnace, means for mounting said frame for movement on said supporting means toward and from said gathering opening, a pilot handle carried by the frame and connected to the gearing for manipulating the tool and manually rotating or oscillating the punties through said gearing, and electric motor driven means connected to the gearing for rotating the punties through the gearing, said means embodying a torque motor, a reduction gearing driven thereby, and a flexible shaft driven by said reduction gearing.

15. In a glass gathering apparatus, a gathering tool comprising a plurality of punties, a frame in which said punties are mounted for axial rotation, gearing between the punties for rotating or oscillating the punties in the same direction and at the same speed, a support mounting said frame for movement toward and from a furnace, means for manually rotating the punties through said gearing, an electric motor for automatically rotating the punties through said gearing, a rheostat for controlling the supply of electric current to the motor, and a foot pressure actuated device for controlling the rheostat.

16. In a glass gathering and molding or pressing apparatus, the combination of a melting furnace having a gathering opening in one of its walls located at a suitable high level above the floor of the room in which the furnace is disposed, a work platform on which a puntyman may stand disposed at a level above the floor and below the gathering opening, a plurality of molds disposed adjacent to said wall and below the level of the platform, a multiple punty gatherer arranged above the level of the platform so as to be moved into and out of the furnace and manipulated for gathering actions by a workman standing on the platform, said multiple punty including manually operable means and motor driven means for simultaneously operating the individual punties for glass gathering operations and means for throwing said motor driven means into and out of action at will, a plural cutter arranged adjacent to and below the level of the gathering opening and above the level of the platform for simultaneously severing the gathers from the punties on their withdrawal from the furnace, and guides arranged beneath the cutter and extending below the platform for conducting the severed gathers by gravity to the respective molds.

17. In a glass gathering device, the combination of a supporting frame, a plurality of axially rotatable punties mounted in the frame, gearing connecting the punties for rotation in unison, a pilot handle carried by the frame and connected to the gearing, whereby the device may be manipulated and the gearing manually operated for gathering actions, an electric motor, a flexible drive shaft driven by the motor and connected to the gearing, and a switch controlling the flow of electric current to the motor and operative for rendering the motor effective or ineffective for operating the gearing whereby to adapt the gearing to be independently operated by manual actuation of the pilot handle or by power from the motor or to be operated by manual actuation of said pilot handle and power from the motor.

18. In combination, a furnace for containing molten glass, said furnace having a gathering opening, and a glass gathering device comprising a frame, an overhead support, means suspending the frame from said support so that the frame may be moved toward and from said gathering opening, a plurality of axially rotatable gathering irons mounted in the frame, gearing connecting the irons for rotating them in unison, a pilot handle carried by the frame and connected to the gearing, an electric motor, a reduction gearing driven by the motor, a flexible shaft driven by said reduction gearing from the motor and connected to the pilot handle, and a foot controlled device for controlling the supply of electric current to the motor.

19. In combination, a furnace for containing molten glass, said furnace having a gathering opening, and a glass gathering device comprising a frame, a support, means mounting the frame on the support so that the frame may be moved toward and from said gathering opening, a plurality of axially rotatable gathering irons mounted in the frame, gearing connecting the irons for rotating them in unison, a pilot handle carried by the frame and connected to the gearing, an electric motor, a reduction gearing driven by the motor, a flexible shaft driven by said reduction gearing from the motor and connected to the gearing, and a device for controlling the supply of electric current to the motor.

20. In a glass gathering apparatus, the combination of a frame, a plurality of axially rotatable punties journaled in the frame, gearing connecting the punties for rotating or oscillating them in unison, motor driven means normally inactive to drive the gearing and adapted to be rendered active to drive the gearing to rotate the punties for a glass gathering action, a rotatable pilot handle for manipulating the tool and driving the gearing, said handle and motor driven means being conjointly operable when the latter is active to operate the gearing to rotate the punties for a glass gathering action and said handle being operable in an inactive state of the motor driven means to operate the gearing to rotate and oscillate the punties to maintain and shape the glass gathers on the punties, and means for rendering the motor driven means active or inactive.

21. In a glass gathering tool, the combination of a frame, a plurality of axially rotatable punties journaled in the frame, gearing connecting the punties for rotating them or oscillating them in unison, normally inactive motor driven means for driving the gearing to rotate the punties for a glass gathering action, a rotatable pilot handle for manipulating the tool and driving the gearing, said handle being operable in an inactive state of the motor driven means to operate the gearing to rotate and oscillate the punties so as to retain and shape the glass gathers on the punties, and means for rendering the motor driven means active or inactive.

22. In a glass gathering apparatus, and in combination with a glass melting furnace, a glass gathering tool comprising supporting means arranged adjacent to the furnace, a frame extending transversely of the tool and mounted on said supporting means for travel toward and from the furnace and for tilting movements toward and from the glass, a plurality of punties journaled for axial rotation in the frame, spaced gears on the punties, motion transmitting means between the gears forming therewith an indirect gearing for simultaneously rotating all the punties in the same direction, manually operable means for operating the gearing, a motor for operating the gearing, the manually operable means and the motor being coupled to the gearing so as to adapt the punties to be operated either by the motor or by the manually operable means, and means for rendering the motor effective or ineffective for operating the gearing.

23. In a glass gathering apparatus, and in combination with a glass melting furnace, a glass gathering tool comprising supporting means arranged adjacent to the furnace, a frame extending transversely of the tool and mounted on said supporting means for travel toward and from the furnace and for tilting movements toward and from the glass, a plurality of punties journaled for axial rotation in the frame, spaced gears on the punties, motion transmitting means between the gears forming therewith an indirect gearing for simultaneously rotating all the punties in the same direction, a motor for operating the gearing, and means for rendering the motor effective or ineffective for operating the gearing.

24. In a multiple glass gathering device, the combination of a supporting frame, a plurality of axially rotatable gathering irons carried thereby, indirect gearing connecting the irons for rotation in unison in the same direction, manually operable means for operating said gearing, motor driven means for operating the gearing, and means for rendering the motor driven means effective or ineffective for operating the gearing.

JOSIAH H. WILLIAMS.